UNITED STATES PATENT OFFICE.

WILHELM HERZBERG AND OSCAR WEBER, OF BERLIN, GERMANY, ASSIGNORS TO THE ACTIEN-GESELLSCHAFT FÜR ANILIN FABRIKATION, OF SAME PLACE.

BLACK DYE.

SPECIFICATION forming part of Letters Patent No. 541,750, dated June 25, 1895.

Application filed April 4, 1895. Serial No. 544,474. (Specimens.)

*To all whom it may concern:*

Be it known that we, WILHELM HERZBERG and OSCAR WEBER, of Berlin, in the Kingdom of Prussia, German Empire, have invented new and useful Improvements in the Manufacture of Black Dye; and we do hereby declare that the following is a full, clear, and exact description of the invention, which will enable others skilled in the art to which it appertains to make and use the same.

The invention relates to the production of a new black dye which is prepared by tetrazotising the following substance:

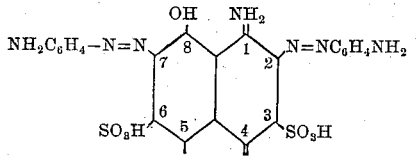

and combining the tetrazo compound:

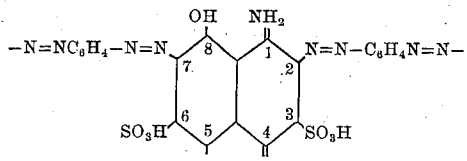

produced with two molecules of meta-toluylendiamin.

The substance aforementioned from which we start when producing our new dye may be prepared by combining two molecular proportions of para-nitrodiazobenzene with one molecular proportion of the so-called amidonaphtoldisulfonic acid H (alpha$_1$, alpha$_4$-amidonaphtol-beta$_2$-beta$_3$-disulfonic acid) and reducing the product formed in this way by means of sodium sulfid. The same product can also be obtained by first combining two molecular proportions of acetyl-para-phenylene-diamin with one molecular proportion of the said amidonaphtoldisulfonic acid and subsequently splitting off the acetyl-groups.

The product obtained in the one or the other way in the dry state forms a black powder with a metallic luster. It dissolves in water with an indigo blue color. The solution in concentrated sulfuric acid is of a blue black color which by diluting with water changes into pure blue, an excess of water producing a precipitation of the free color acid.

The tetrazo compound of the product described above is moderately soluble in water with blue black color.

The production of our new dye may be illustrated by the following example:

Fourteen parts of the new amidocompound described above are tetrazotised by means of 3, 5 parts of nitrite of soda and twenty parts hydrochloric acid (20° Baumé). The solution of the tetrazocompound is poured into a cold solution of 6,1 parts of toluylenediamin which is kept alkaline by an excess of carbonate of soda. The formation of the new dyestuff will be completed after a short time and the dye is separated by means of salt, filtered and dried.

The new coloring matter in the dry state forms a black powder with a metallic luster. It is moderately soluble in cold water, very readily soluble in hot water with black violet color, which on addition of caustic soda lye turns more blue-black. In alcohol it is practically insoluble.

The solution in concentrated sulfuric acid is greenish blueblack. On the addition of water it at first assumes a violet blue color, while by further diluting the free color acid is precipitated in the form of dark flakes.

The dye produces on unmordanted cotton in an alkaline or salt bath black shades of great intensity and remarkable fastness against light, air and soap.

Instead of meta-toluylenediamin we may also use its equivalents, as for instance meta-phenylenediamin, without materially changing the character of the product obtained.

Having now described our invention, what we claim is—

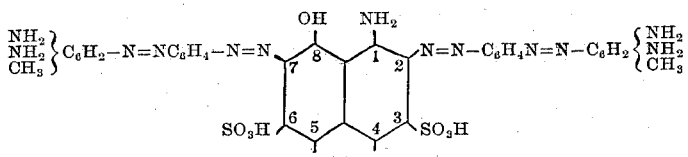

said dye being readily soluble in hot water, practically insoluble in alcohol, dissolving in concentrated sulfuric acid with greenish blue-black color, which on addition of water changes at first into violet-blue, while on further diluting the free color acid separates out from this solution in the form of a dark precipitate, producing on unmordanted cotton a fast deep black shade.

The black dye prepared by means of the tetrazo compound

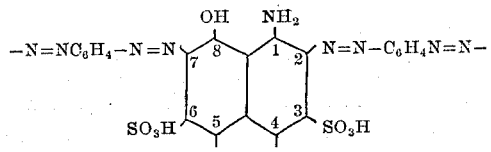

and having—in case meta-toluylenediamin be used—the constitution:

In testimony whereof we hereunto set our hands and affix our seals, in the presence of two witnesses, this 20th day of March A. D. 1895.

WILHELM HERZBERG. [L. S.]
OSCAR WEBER. [L. S.]

Witnesses:
OSCAR SCHULTHESS,
GUSTAV LUCHT.